US010138354B2

(12) United States Patent
Groos et al.

(10) Patent No.: US 10,138,354 B2
(45) Date of Patent: Nov. 27, 2018

(54) POLYMER COMPOSITION HAVING DELAYED CRYSTALLIZATION BEHAVIOR, ADDITIVE COMPOSITION THAT INFLUENCES THE CRYSTALLIZATION BEHAVIOR, METHOD FOR REDUCING THE CRYSTALLIZATION POINT AND/OR THE CRYSTALLIZATION SPEED, AND USE OF AN ADDITIVE COMPOSITION

(71) Applicant: FRAUNHOFER-GESELLSCHAFT ZUR FÖRDERUNG DER ANGEWANDTEN FORSCHUNG E.V., München (DE)

(72) Inventors: Benjamin Groos, Hamburg (DE); Rudolf Pfaendner, Rimbach (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 10 days.

(21) Appl. No.: 15/529,026

(22) PCT Filed: Dec. 7, 2015

(86) PCT No.: PCT/EP2015/078830
§ 371 (c)(1),
(2) Date: May 23, 2017

(87) PCT Pub. No.: WO2016/091807
PCT Pub. Date: Jun. 16, 2016

(65) Prior Publication Data
US 2017/0267835 A1 Sep. 21, 2017

(30) Foreign Application Priority Data
Dec. 10, 2014 (DE) .................. 10 2014 225 488

(51) Int. Cl.
C08K 5/42 (2006.01)
C08K 3/16 (2006.01)
C08K 5/00 (2006.01)
C08K 5/22 (2006.01)
C08K 5/098 (2006.01)

(52) U.S. Cl.
CPC .............. C08K 5/42 (2013.01); C08K 3/16 (2013.01); C08K 5/0083 (2013.01); C08K 5/098 (2013.01); C08K 5/22 (2013.01)

(58) Field of Classification Search
CPC .......... C08K 5/42; C08K 5/0083; C08K 5/22; C08K 5/098; C08K 3/16
USPC .................................................. 524/100
See application file for complete search history.

(56) References Cited

U.S. PATENT DOCUMENTS

2005/0234159 A1   10/2005   Takeuchi et al.

FOREIGN PATENT DOCUMENTS

| CN | 103694692 A | 4/2014 |
| DE | 2 012 105 A1 | 11/1970 |
| DE | 2 229 803 A1 | 1/1973 |
| GB | 1309944 A | 3/1973 |
| GB | 1 402 021 A | 8/1975 |

OTHER PUBLICATIONS

Sukata et al. "Influence of the Nigrosine Dye on the Thermal Behavior of Polyamide 66", Journal of Applied Polymer Science, vol. 101, 3270-3274, (2006). (Year: 2006).*
Xu et al. "Investigation on the Interaction between Polyamide and Lithium Salts", Journal of Applied Polymer Science, vol. 77, 2685-2690, (2000). (Year: 2000).*
State Intellectual Property Office of People's Republic of China, Notification of First Office Action in Chinese Patent Application No. 201580067742.9 (dated Apr. 2, 2018).
Berneth, H., "Azine Dyes," Ullmann's Encyclopedia of Industrial Chemistry, (2005)—Table of contents only.
Kurja et al., "Nucleating Agents for Semicrystalline Polymers," Plastic Additives Handbook, 6th Edition, H.Zweifel et al. Editors (Munich, Germany), pp. 967-990 (2009)—Abstract only.
Mercier, J.P., "Nucleation in polymer crystallization: A physical or a chemical mechanism?," Polym. Eng. Sci 30(5): 270-278 (1990)—Abstract only.
Wellen et al., "Antinucleating action of polystyrene on the isothermal cold crystallization of poly(ethylene terephthalate)," J. Appl. Polym. Sci. 114(3): 1184-1895 (2009)—Abstract only.
Wellen et al., "Non-isothermal cold crystallization kinetics and morphology of PET + SAN blends," J. Appl. Polym. Sci 116(2): 1077-1087 (2010)—Abstract only.
Sukata et al., "Influence of the Nigrosine Dye on the Thermal Behavior of Polyamide 66," J. Appl. Polym. Sci. 101: 3270-3274 (2006).
Xu et al., "Investigation on the Interaction between Polyamide and Lithium Salts," J. Appl. Polym Sci 77: 2685-2690 (2000).
Wellen et al., "Effect of styrene-co-acrylonitrile on cold crystallization and mechanical properties of poly(ethylene terephthalate)," J. Appl. Polym. Sci 125(4): 2701-2710 (2012).
European Patent Office, International Search Report in International Application No. PCT/EP2015/078830 (dated Mar. 11, 2016).

(Continued)

Primary Examiner — Michael Bernshteyn
(74) Attorney, Agent, or Firm — Leydig, Voit & Mayer, Ltd.

(57) ABSTRACT

The invention relates to a polymer composition, which contains or consists of a matrix of at least one thermoplastic polymer capable of crystallization and, incorporated therein, at least one azine dye and at least mono-, di-, tri-, and/or tetravalent metal salt. Said polymer composition is characterized in that the crystallization point thereof is considerably reduced in comparison with polymer compositions having no additives or a composition containing only an azine dye or a metal salt as an additive. The invention further relates to a corresponding additive composition for the crystallization and/or for the lowering of the crystallization point of thermoplastic polymers or polymer compositions capable of crystallization.

19 Claims, No Drawings

(56) References Cited

OTHER PUBLICATIONS

European Patent Office, Written Opinion in International Application No. PCT/EP2015/078830 (dated Mar. 11, 2016).
International Bureau of WIPO, International Preliminary Report on Patentability in International Application No. PCT/EP2015/078830 (dated Jun. 22, 2017).

* cited by examiner

POLYMER COMPOSITION HAVING DELAYED CRYSTALLIZATION BEHAVIOR, ADDITIVE COMPOSITION THAT INFLUENCES THE CRYSTALLIZATION BEHAVIOR, METHOD FOR REDUCING THE CRYSTALLIZATION POINT AND/OR THE CRYSTALLIZATION SPEED, AND USE OF AN ADDITIVE COMPOSITION

CROSS-REFERENCE TO RELATED APPLICATIONS

This patent application is the U.S. national phase of International Application No. PCT/EP2015/078830, filed on Dec. 7, 2015, which claims the benefit of German Patent Application No. 10 2014 225 488.4, filed Dec. 10, 2014, the disclosures of which are incorporated herein by reference in their entireties for all purposes.

The present invention relates to a polymer composition which comprises a matrix made of at least one crystallisable, thermoplastic polymer, and also, incorporated herein, at least one azine dye and also at least mono-, bi-, tri- and/or tetravalent metal salt or consists hereof. This polymer composition is distinguished by the crystallisation point thereof, relative to non-additivated polymer compositions or only with one azine dye or with one metal salt-additivated composition, being significantly reduced. In addition, the present invention relates to a corresponding additive composition for crystallisation and/or for lowering the crystallisation point of crystallisable, thermoplastic polymers or polymer compositions.

In addition, the invention relates to a method for influencing the crystallisation behaviour of crystallisable, thermoplastic polymers or polymer compositions, in the case of which one azine dye and also one of the previously mentioned metal salts is incorporated in a thermoplastic crystallisable matrix polymer or a polymer composition. In addition, purposes of use of the previously mentioned additive composition, consisting of an azine dye and a metal salt, are indicated.

Thermoplastic plastic materials are present either in amorphous or (partially)crystalline form. In amorphous plastic materials, the polymer chains are disordered. Amorphous polymers, such as e.g. polystyrene, PVC or polycarbonate, are frequently transparent, glossy, mechanically brittle and often have low chemical resistance. During processing in the melting process, the flowability is rather comparatively low, however e.g. the shrinkage of a moulded part produced with these amorphous plastic materials is low, i.e. advantageous. In the case of (partially)crystalline plastic materials, the polymer chains are positioned in an orderly fashion one against the other in so-called lamellae. (Partially)crystalline polymers, such as polypropylene, polyester or polyamide, are generally opaque with a tough, hard mechanical behaviour and good chemical resistance. The flowability during melt processing is frequently high but the shrinkage in the moulded part is pronounced. Partially crystalline polymers have, in addition to crystalline regions, also an amorphous phase. The properties of partially crystalline polymers are then determined, inter alia, by the proportion of crystallites relative to the amorphous proportions, the so-called crystallisation degree, the shape of the crystallites (so-called spherulites), the size, the number and the distribution of the crystallites in the amorphous matrix.

In order to adapt specific properties of plastic materials specifically during processing and in application, the crystallisation behaviour of plastic materials can then, inter alia, be influenced by the processing conditions but also by corresponding additives. For example, frequently so-called nucleation agents (or nuclei formers) are added to the plastic material. These additives can then reduce the cycle times in the production process, increase the transparency of the plastic material, improve the mechanical properties and the thermostability (see e.g. J. Kurja, N. A. Mehl, Nucleating agents for semicrystalline polymers in Plastic Additives Handbook, 6th Edition, H. Zweifel, R. D. Maier, M. Schiller (Editor), Munich 2009, page 967-990). As nucleation agents, a large number of chemical substance classes is used, such as e.g. sorbitol derivatives, metal phosphates or aryl amides in polypropylene, alkali metal salts, such as e.g. sodium benzoate in polyethylene terephthalate (PET) and talc or alkaline earth salts of adipic acid in the case of polyamides. Physical and chemical processes of the nucleation of polymers are described e.g. in J. P. Mercier, Pol. Eng. Sci. 1990, 30, 270-278.

On the other hand, it can be desired also for specific applications or for achieving specific properties to prevent or to delay the crystallisation of partially crystalline polymers. However, there are only very few additives for this purpose which can effect this. In the case of polyesters, for example the crystallisation is restricted by the addition of SAN (styrene-acrylonitrile copolymer) or polystyrene (R. M. R. Wellen, M. S. Rabello, J. Appl. Pol. Sci. 2009, 114, 1884-1895, R. M. R. Wellen, M. S. Rabello, J. Appl. Pol. Sci. 2010, 116, 1077-1087, R. M. R. Wellen, E. L. Canedo, M. S. Rabello, J. Appl. Pol. Sci. 2012, 125, 2701-2710), in the case of polyamides aromatic compounds (US 2005/02344159) inter alia are proposed for this purpose.

For the production of (partially) crystalline polymers, in particular polyamides with delayed crystallisation or a lowered crystallisation point, various substance classes were examined, such as e.g. polycyclic aromatics (US 2005/02344159), amongst these above all dyes, such as nigrosine (K. Sukata et al. J. Appl. Pol. Sci. 2006, 101, 3270-3274) or various metal salts (DE 2012105, DE 2229803), such as e.g. lithium salts (Y. Z. Xu et al. J. Appl. Pol. Sci. 2000, 77, 2685-2690). The previously described additives do not, however, fulfil all needs, in particular there is a need, with as low as possible quantities of additive, to achieve a significant lowering of the crystallisation temperature or a delay in the crystallisation or the crystallisation speed. Small additive quantities are advantageous since, as a result, other polymer properties are influenced less and furthermore cost advantages are associated therewith.

It was therefore the object of the present invention to make available improved additives or supplements for crystallisation delay or for lowering the crystallisation point of (partially)crystalline polymers, in particular of polyamides and plastic material compositions resulting therefrom.

This object is achieved, with respect to a polymer composition, by the features of patent claim 1. In addition, with patent claim 13, an additive composition for crystallisation delay and/or for lowering the crystallisation point of crystallisable, thermoplastic polymers or compositions is indicated. With patent claim 17, the present invention relates to a method for crystallisation delay and/or for lowering the crystallisation point of a crystallisable, thermoplastic polymer, purposes of use of this additive composition are indicated by patent claim 19. Patent claim 20 relates finally to a moulded part made of the composition according to the invention according to claim 1. The respectively dependent patent claims thereby represent advantageous developments.

The invention hence relates to polymer compositions, comprising or consisting of a) a matrix made of at least one crystallisable, thermoplastic polymer,
b) at least one azine dye, and also
c) at least one mono-, bi-, tri- and/or tetravalent metal salt, selected from the group consisting of metal chlorides, metal bromides and metal pseudohalogenides and also mixtures or combinations hereof.

Crystallisable, thermoplastic polymers thereby have a crystallite melting point which can be detected for example by differential scanning calorimetry (DSC), by differential mechanical analysis (DMA) or by microscopy.

Azine dyes b) are standard commercial products and described for example in H. Bernetz, Azine Dyes, Ullmann's Encyclopedia of Industrial Chemistry (DOI 10.1002/14356007.a03_213.pub3). Preferred azine dyes are indulines and nigrosines, nigrosines are very particularly preferred. For the purposes of the present invention with respect to the azine dyes used according to the invention, reference is made to the definition in the previously mentioned literature passage.

The metal salts c) are commercially available. These can thereby concern inorganic or organic salts. Preferred mono-, bi-, tri- or tetravalent metal salts are in particular alkali- and alkaline earth salts, alkali- and alkaline earth halogenides are very particularly preferred and, here in particular, chlorides or bromides, such as e.g. lithium chloride, lithium bromide, magnesium chloride and calcium chloride.

Surprisingly, it could be observed that the combination of an azine dye and a mono-, bi-, tri- or tetravalent metal salt leads to a noticeable lowering of the crystallisation point or to crystallisation delay in the case of crystallisable polymers. The lowering of the crystallisation point is thereby influenced synergistically by the presence both of the azine dye and of the previously mentioned metal salt. It was hereby particularly surprising that the combination of selected dyes, such as e.g. nigrosine with metal salts such as e.g. alkali- and alkaline earth halogenides, leads to a synergistic influence on the crystallisation of crystallisable thermoplastics, in particular polyamides.

Hence new combinations for lowering the crystallisation temperature of (partially)crystalline polymers, which achieve a high effect in comparatively low usage concentrations relative to current products, are proposed. Due to the low usage concentrations, other polymer properties are not or less negatively influenced than in the conventional case. The compositions used are cheaply available on a large industrial scale.

According to a preferred embodiment, the at least one azine dye is selected from the group consisting of phenazine dyes, oxazine dyes, thiazine dyes and/or bisazine dyes. In particular, nigrosines and/or indulines can be used as azine dye, nigrosines being particularly preferred.

The initially mentioned metal salt is selected preferably from the group consisting of alkali metal-, alkaline earth metal- and also transition metal chlorides, -bromides and/or -pseudohalogenides, preferably alkali metal chlorides, -bromides and/or -pseudohalogenides, alkaline earth metal chlorides, -bromides and/or -pseudohalogenides and also transition metal chlorides, -bromides and/or -pseudohalogenides, and very particularly lithium chloride, lithium bromide, lithium benzoate, magnesium chloride and/or calcium chloride and/or zinc chloride.

With respect to the mixture ratio of the azine dye to the metal salt, weight ratios from 1:99 to 99:1, preferably from 10:90 to 90:10, further preferably from 80:20 to 20:80 are preferred.

Preferred crystallisable, thermoplastic polymers of the polymer matrix are thereby selected from the group consisting of
a) polymers made of olefins or diolefins, such as e.g. polyethylene (LDPE, LLDPE, VLDPE, ULDPE, MDPE, HDPE, UHMWPE), metallocene-PE (m-PE), polypropylene, polyolefin-ketone copolymers
b) polyacetals, such as e.g. polyoxymethylene (POM) or copolymers with e.g. butanal,
c) polyphenylene oxides and blends with polystyrene or polyamides,
d) polyamides, such as e.g. polyamide-6,6.6,6.10,4.6, 4.10,6.12,12.12, polyamide 11, polyamide 12 and also (partially)aromatic polyamides, such as e.g. polyphthalamides, e.g. produced from terephthalic acid and/or isophthalic acid and aliphatic diamines or from aliphatic dicarboxylic acids, such as e.g. adipic acid or sebacic acid and aromatic diamines, such as e.g. 1,4- or 1,3-diaminobenzene,
e) polyimides, polyamide imides, polyetherimides, polyesterimides, poly(ether)ketones, polyarylsulphones, polyphenylensulphide, polybenzimidazoles, polyhydantoins,
f) polyesters made of aliphatic or aromatic dicarboxylic acids or diols or made of hydroxycarboxylic acids, such as e.g. polyethylene terephthalate (PET), polybutylene terephthalate (PBT), polypropylene terephthalate (PPT), polyethylene naphthylate, poly-1,4-dimethylolcyclohexane terephthalate, polyhydroxybenzoate, polyhydroxynaphthylate, polylactic acid (PLA), polyhydroxybutyrate (PHB), polyhydroxyvalerate (PHV),
g) and also mixtures, combinations or blends of two or more of the previously mentioned polymers or also of combinations or blends of the (partially)crystalline polymers with amorphous polymers, e.g. based on polystyrenes, halogen-containing polymers, such as PVC, polyurethanes or polycarbonates.

Provided that the above-mentioned polymers are copolymers, these can be present in the form of statistical ("random") block or "tapered" structures.

If stereoregular polymers are concerned, these can be present in the form of isotactic, stereotactic but also atactic forms or as stereoblock copolymers.

Possibly, the (partially)crystalline polymers mentioned under a) to g) can also be present crosslinked. Crosslinking can thereby be effected e.g. by addition of radical formers or by irradiation, such as electron beams, beta- or gamma rays, during processing or in a subsequent step.

The mentioned polymers a) to f) can thereby be present not only as virgin material but also in the form of recyclates, e.g. as production waste or material collections ("postconsumer" recyclates).

According to a particularly preferred embodiment, the polymer matrix consists of a polymer, selected from the group consisting of polyamides and polyesters, in particular polyamide 6, polyamide 66, polyethylene terephthalate, polybutylene terephthalate and polylactic acid. Polyamides are hereby preferred in particular, for very particular preference polyamide 6 or polyamide 66 and also blends of polyamide 6 and polyamide 6.6.

In addition, it is preferred that the polymer composition comprises
a) 99.98 to 80.00 parts by weight, preferably 99.96 to 94 parts by weight, of a matrix of at least one crystallisable, thermoplastic polymer,
b) 0.01 to 10 parts by weight, preferably 0.02 to 3 parts by weight, of at least one azine dye and also c) 0.01 to 10 parts by weight, preferably 0.02 to 3 parts by weight, of at least one mono-, bi-, tri- and/or tetravalent metal salt, the parts by weight of components a) to c) adding up to 100 parts by weight, or consists hereof.

In particular, the polymer composition comprises or consists of
a) 99.98 to 80.00 parts by weight, preferably 99.96 to 94 parts by weight, of a matrix of at least one polyamide or polyester,
b) 0.01 to 10 parts by weight, preferably 0.02 to 3 parts by weight, of at least one nigrosine and also
c) 0.01 to 10 parts by weight, preferably 0.02 to 3 parts by weight, of at least one alkali- or alkaline earth halogenide or -pseudohalogenide, the parts by weight of components a) to c) adding up to 100 parts by weight.

In addition, the composition can comprise further additives, in particular selected from the group consisting of UV absorbers, light stabilisers, stabilisers, hydroxylamines, benzofuranones, metal deactivators, filler deactivators, flame retardants, nucleation agents, impact strength enhancers, plasticisers, lubricants, rheology modifiers, chain lengtheners, processing aids, pigments, colourants, fillers, reinforcing materials, optical brighteners, antimicrobial active substances, antistatic agents, slip agents, antiblocking agents, coupling means, dispersants, compatibilisers, oxygen collectors, acid collectors, marking means, anti-fogging means and also mixtures and combinations of at least two of the previously mentioned additives.

In the case where the previously mentioned additives are contained in the polymer composition, the content of the polymer matrix is reduced by the amount which the at least one additive in this case constitutes in the composition. For each additive, a separate defined content can thereby be prepared. For example, acid collectors are frequently used in a concentration of 0.05-0.5%, phenolic antioxidants in 0.02-0.5%, phosphites in 0.02-0.3%, light stabilisers in 0.05-1%, dispersants in 0.1-1% and chain lengtheners in 0.05-0.5%. Preferably, in particular in the case of polyamides as matrix polymers, copper (1) iodide is used as stabiliser, possibly also in combination with potassium iodide. For example, the stabilisers can thereby be contained in a quantity of up to 50 ppm in the composition.

In a preferred embodiment, the compositions comprise in particular acid collectors, e.g. based on salts of long-chain acids, such as e.g. calcium stearate, magnesium stearate, zinc stearate, calcium lactate or on hydrotalcites and/or stabilisers from the group of phenolic antioxidants and phosphites and/or light stabilisers from the group of hindered amines (HALS) and/or dispersants and/or flame retardants and/or fillers/reinforcing materials and/or chain lengtheners.

Suitable light stabilisers are for example compounds based on 2-(2'-hydroxyphenyl)benzotriazoles, 2-hydroxybenzophenones, esters of benzoic acids, acrylates, oxamides and 2-(2-hydroxyphenyl)-1,3,5 triazines.

Preferred phenolic antioxidants are for example:
octadecyl-3-(3,5-di-tert-butyl-4-hydroxyphenyl) propionate, pentaerythritoltetrakis[3-(3,5-di-tert-butyl-4-hydroxyphenyl) propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethylene glycol-bis[3-(3-tert-butyl-4-hydroxy-5-methylphenyl)propionate, N,N'-hexan-1,6-diyl-bis[3-(3,5-di-tert-butyl-4-hydroxyphenyl)propionic acid amide.

Suitable phosphites/phosphonites are for example:
triphenylphosphite, diphenylalkylphosphites, phenyldialkylphosphites, tri(nonylphenyl)phosphite, trilaurylphosphites, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl) pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl)pentaerythritoldiphosphite, tristearylsorbitoltriphosphite, tetrakis(2,4-di-tert-butylphenyl)-4,4-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyldibenzo[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Further suitable stabilisers are aminic antioxidants, such as e.g.:
N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Further suitable aminic antioxidants are hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and also Genox EP (Addivant) according to the formula.

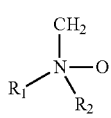

Genox EP

R₁, R₂ = C₁₄-C₂₄ alkyl

Further suitable stabilisers are thiosynergists. Suitable thiosynergists are, for example, distearylthiodipropionate, dilauryldipropionate or the compound according to the following formula:

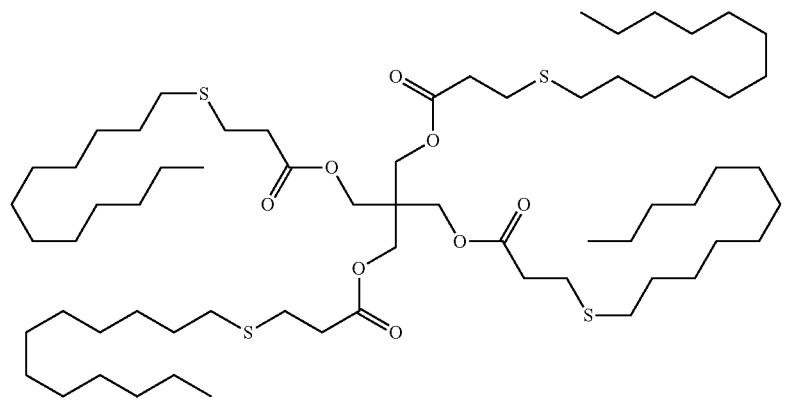 [SMILES: CCCCCCCCCCCCSCCC(=O)OCC(COC(=O)CCSCCCCCCCCCCCC)(COC(=O)CCSCCCCCCCCCCCC)COC(=O)CCSCCCCCCCCCCCC]

Further suitable stabilisers, in particular for polyamides, are copper salts, such as e.g. copper(I) iodide, copper(I) bromide or copper complexes, such as e.g. triphenylphosphine-copper(I) complexes.

Suitable hindered amines are for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane und epichlorohydrin.

Suitable dispersants are for example:
polyacrylates, e.g. copolymers with long-chain side groups, polyacrylate block copolymers, alkylamides: e.g. N,N'-1,2-ethandiylbisoctadecaneamide sorbitan ester, e.g. monostearyl sorbitan ester, titanates und zirconates, reactive copolymers with functional groups, e.g. polypropylene-co-acrylic acid, polypropylene-co-maleic anhydride, polyethylene-co-glycidylmethacrylate, polystyrene-alt-maleic anhydride-polysiloxanes: e.g. dimethylsilanediol-ethylene oxide copolymer, polyphenylsiloxane copolymer, amphiphilic copolymers: e.g. polyethylene-block-polyethylene oxide, dendrimers, e.g. hydroxyl group-containing dendrimers.

Suitable flame retardants are for example:
a) inorganic flame retardants, such as e.g. $Al(OH)_3$, $Mg(OH)_2$, $AlO(OH)$, $MgCO_3$, layer silicates, such as e.g. montmorillonite, non- or organically modified double salts, such as e.g. Mg—Al silicates, POSS (Polyhedral Oligomeric Silsesquioxane) compounds, huntite, hydromagnesite or halloysite and also $Sb_2O_3$, $Sb_2O_5$, $MoO_3$, zinc stannate, zinc hydroxystannate,
b) nitrogen-containing flame retardants, such as e.g. melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine-metal phosphates, such as e.g. melamine aluminium phosphate, melamine zinc phosphate, melamine magnesium phosphate, and also the corresponding pyrophosphates and polyphosphates, poly-[2,4-(piperazin-1,4,-yl]-6-(morpholin-4-yl)1,3,5-triazine], ammonium polyphosphate, melamine borate, melamine hydrobromide,
c) radical formers, such as e.g. alkoxyamines, hydroxylamine esters, azo compounds, dicumyl or polycumyl, hydroxyimides and the derivatives thereof, such as e.g. hydroxyimide ester or hydroxyimide ether,
d) phosphorus-containing flame retardants, such as e.g. red phosphorus, phosphates such as e.g. resorcin diphosphate, bisphenol-A-diphosphate and the oligomers thereof, triphenylphosphate, ethylene diamine phosphate, phosphinates, such as e.g. salts of hypophosphorous acid and the derivatives thereof, such as alkyl phosphinate salts, e.g. diethylphosphinate aluminium or diethylphosphinate zinc or aluminium phosphinate, aluminium phosphite, aluminium phosphonate, phosphonate esters, oligomeric and polymeric derivatives of methanephosphonic acid, 9,10-dihydro-9-oxa-10-phosphorylphenanthrene-10-oxide (DOPO) and the substituted compounds thereof,
e) halogen-containing flame retardants based on chlorine and bromine, such as e.g. polybrominated diphenyl oxides, such as e.g. decabromodiphenyl oxide, tris(3-bromo-2,2-bis(bromomethyl)propylphosphate, tris(tribromoneopentyl)phosphate, tetrabromophthalic acid, 1,2-bis(tribromophenoxy)ethane, hexabromocyclododecane, brominated diphenylethane, tris-(2,3,-dibromopropyl)isocyanurate, ethylene-bis(tetrabromophthalimide), tetrabromobisphenol-A, brominated polystyrene, brominated polybutadiene or polystyrene-brominated polybutadiene copolymers, brominated epoxy resin, polypentabromobenzylacrylate, possibly in combination with $Sb_2O_3$ and/or $Sb_2O_5$, f) borates, such as e.g. zinc borate or calcium borate,
g) sulphur-containing compounds, such as e.g. elementary sulphur, disulphides and polysulphides, thiuram sulphide, dithiocarbamates, mercaptobenzothiazole and sulphenamides,
h) antidrip agents, such as e.g. polytetrafluoroethylene
i) silicon-containing compounds, such as e.g. polyphenylsiloxanes and also combinations or mixtures hereof.

Suitable fillers and reinforcing materials are for example synthetic or natural materials, such as e.g. calcium carbonate, silicates, glass fibres, glass balls (solid or hollow), talc, mica, kaolin, barium sulphate, metal oxides and metal hydroxides, carbon black, graphite, carbon nanotubes, graphene, sawdust or fibres of natural products, such as e.g. cellulose, or synthetic fibres. Further suitable fillers are hydrotalcites or zeolites or layer silicates, such as e.g. montmorrillonite, bentonite, beidelite, mica, hectorite, saponite, vermiculite, ledikite, magadite, illite, kaolinite, wollastonite, attapulgite, sepiolite.

Suitable chain lengtheners for the linear molecular weight increase of polycondensation polymers such as polyesters or polyamides are for example diepoxides, bis-oxazolines, bizoxazolones, bis-oxazines, diiosocyanates, dianhydrides, bis-acyllactams, bis-maleimides, dicyanates, (poly)carbodiimides. Further suitable chain lengtheners are polymeric compounds, such as e.g. polystyrene-polyacrylate-polyglycidyl(meth)acrylate copolymers, polystyrene-maleic anhydride copolymers and polyethylene-maleic anhydride copolymers.

The polymer compositions according to the invention are suitable in particular for further processing to form special moulded parts, such as e.g. injection moulded parts, foils or films, foams, fibres, cables and pipes, profiles, hollow bodies, strips, membranes, such as e.g. geomembranes, which are produced via extrusion, injection moulding, blow-moulding, calendering, pressing processes, spinning processes, roto-moulding or brushing and coating processes, e.g. for the electrical and electronics industry, construction industry, transport industry (cars, aircraft, ships, trains), for medical applications, for household and electrical appliances, vehicle parts, consumer articles, packaging, furniture, textiles. These moulded parts likewise are part of the present invention.

A further preferred application of the compositions according to the invention are polymer materials which are used for generative manufacturing ("additive manufacturing", "rapid prototyping", "rapid manufacturing"). For example a polymer powder is thereby introduced, in a layer construction method or in a printing method by means of thermal or (photo-)chemical processes, into a three-part mould. Examples of generative manufacturing methods are selective laser sintering (SLS), selective laser melting (SLM), fused deposition modelling (FDM) or 3D printing. The compositions according to the invention are particularly suitable for thermal layer construction methods, such as selective laser sintering. A further preferred application of the compositions according to the invention are polymer materials which are suitable for plastic material welding.

The present invention relates in addition to an additive composition for crystallisation delay and/or reducing the crystallisation speed and/or for lowering the crystallisation point of crystallisable, thermoplastic polymers or polymer compositions, consisting of or comprising a) at least one azine dye, and also
b) at least one mono-, bi-, tri- and/or tetravalent metal salt, selected from the group consisting of metal chlorides, metal bromides and metal pseudohalogenides and also mixtures or combinations hereof.

Surprisingly, it could be observed that this additive composition is capable of influencing the crystallisation behaviour of crystallisable, thermoplastic polymers or polymer compositions in such a way that the addition of an additive composition according to the invention leads to crystallisation delay and/or to a lowering of the crystallisation point of the thermoplastic polymer. Furthermore, by means of this addition or the consequently initiated crystallisation behaviour, further properties of the plastic material are influenced, such as e.g. the surface properties, surface quality, gloss, mechanical properties, electrical properties, rheological properties, ageing, thermal stability.

Preferably, the at least one azine dye is selected from the group consisting of phenazine dyes, oxazine dyes, thiazine dyes and/or bisazine dyes, in particular selected from the group consisting of nigrosines and/or indulines.

Preferably, the at least one mono-, bi-, tri- and/or tetravalent metal salt is selected preferably from the group consisting of alkali metal-, alkaline earth metal- and also transition metal chlorides, -bromides and/or -pseudohalogenides, preferably alkali metal chlorides, -bromides and/or -pseudohalogenides, alkaline earth metal chlorides, -bromides and/or -pseudohalogenides and also transition metal chlorides, -bromides and/or -pseudohalogenides, and very particularly lithium chloride, lithium bromide, lithium benzoate, magnesium chloride and/or calcium chloride and/or zinc chloride.

The weight ratio of the at least one azine dye to the at least one mono-, bi-, tri- and/or tetravalent metal salt is from 1:99 to 99:1, preferably from 10:90 to 90:10, further preferably from 80:20 to 20:80.

The present invention relates likewise to methods for the delay of crystallisation, for lowering the crystallisation speed, for lowering the crystallisation point of a crystallisable, thermoplastic polymer in which a previously described additive composition according to the invention is added to a polymer matrix, comprising or consisting of at least one crystallisable, thermoplastic polymer, the polymer matrix is transferred into the melt and subsequently cooled. Alternatively hereto, it is likewise possible that the previously mentioned additive composition is incorporated in a polymer matrix in the molten state, comprising or consisting of at least one crystallisable, thermoplastic polymer, and subsequently is cooled.

Hence the invention relates likewise to the use of the additive composition according to the invention for the mentioned purposes.

In the case where further components are added to the polymer composition, these can be added separately, in the form of liquids, powders, granulates or compacted products or together with the additive composition according to the invention, as described previously.

The incorporation of the above-described additive composition and possibly of the additional additives into the plastic material is effected by normal processing methods, the polymer being melted and mixed with the additive composition according to the invention and with the possibly further additives, preferably by means of mixers, kneaders and extruders. There are preferred as processing machines, extruders, such as e.g. single-screw extruders, twin-screw extruders, planet-roller extruders, ring extruders, co-kneaders, which are preferably equipped with vacuum degassing. Processing can thereby be effected under air or possibly under inert gas conditions.

Furthermore, the additive compositions according to the invention can be produced and introduced, in the form of master batches or concentrates which comprise for example 10-90% of the compositions according to the invention in a polymer.

In addition, the present invention relates to the use of an additive composition according to the invention for crystallisation delay and/or reducing the crystallisation speed and/or for lowering the crystallisation point of crystallisable, thermoplastic polymers.

The present invention is described in more detail with reference to the subsequent embodiments without however restricting the invention to the illustrated preferred parameters.

EXAMPLE 1-11

A polyamide 6 (Alphalon 27, Grupa Azoty ATT Polymers GmbH) was mixed with various nigrosines and/or metal salts in the melt. The compositions are described in Table 1. The processing in the melt was implemented with a synchronous twin-screw extruder (Thermo Scientific Process 11). The speed of rotation of the screws was 450 l/min, with a throughput of 800 g/h and a melt temperature of 260° C. The hot melt was then cooled in a water bath and subsequently strand-granulated.

Thermal analysis of the compounds was carried out by means of dynamic differential calorimetry (DSC). For examining the melt- and crystallisation behaviour, a DSC 822e (Mettler-Toledo AG) with a constant nitrogen throughflow of 20 ml 1/min and nitrogen cooling was used. The temperature and the heat flow were calibrated with indium and zinc. The sample quantity was always 5 mg with a deviation of ±0.1 mg. An aluminium crucible was used. The samples were heated at 10° C. min-1 from 0° C. to 270° C. and kept there for 3 min. Thereafter, the sample was cooled again to 0° C. at 10° C. min-1. This cycle was repeated twice. Analysis of the characteristic values of melting temperature Ts, peak crystallisation temperature $T_{PC}$ and crystallisation enthalpy ΔHc (J/g) was undertaken with reference to the second heating and cooling cycle. The characteristic value $T_{PC}$, relevant to the invention, is represented in Table 1 for all examples.

TABLE 1

Compositions and crystallisation temperatures of compositions according to the invention and comparative examples

| Example | Additives | W [%] | $T_{PC}$ [° C.] |
|---|---|---|---|
| Comparative example 1 | — | 0 | 186.9 |
| Comparative example 2 | nigrosine A | 0.5 | 181.2 |
| Comparative example 3 | nigrosine A | 1.5 | 178.3 |
| Comparative example 4 | nigrosine A | 3.0 | 180.4 |
| Comparative example 5 | nigrosine B | 0.5 | 176.9 |
| Comparative example 6 | nigrosine B | 3.0 | 176.3 |
| Comparative example 7 | lithium chloride | 0.5 | 180.7 |
| Comparative example 8 | lithium chloride | 1.5 | 168.8 |
| Comparative example 9 | lithium chloride | 3.0 | 152.5 |
| Comparative example 10 | lithium benzoate | 0.5 | 184.9 |
| Comparative example 11 | lithium benzoate | 3.0 | 178.6 |
| Example 1 according to the invention | nigrosine A/lithium chloride 1:2 | 0.5 | 175.6 |
| Example 2 according to the invention | nigrosine A/lithium chloride 1:2 | 3.0 | 143.0 |
| Example 3 according to the invention | nigrosine A/lithium chloride 1:1 | 0.5 | 172.6 |
| Example 4 according to the invention | nigrosine A/lithium chloride 1:1 | 1.5 | 163.4 |
| Example 5 according to the invention | nigrosine A/lithium chloride 1:1 | 3.0 | 145.3 |
| Example 6 according to the invention | nigrosine A/lithium chloride 2:1 | 0.5 | 179.0 |
| Example 7 according to the invention | nigrosine A/lithium chloride 2:1 | 3.0 | 151.0 |
| Example 8 according to the invention | nigrosine B/lithium chloride 1:1 | 0.5 | 157.2 |
| Example 9 according to the invention | nigrosine B/lithium chloride 1:1 | 3.0 | 149.8 |
| Example 10 according to the invention | nigrosine A/lithium benzoate 1:1 | 0.5 | 174.8 |
| Example 11 according to the invention | nigrosine A/lithium benzoate 1:1 | 3.0 | 169.7 |

$T_{PC}$: crystallisation temperature;
w: mass proportion of the additive(s)
Nigrosine A: NIGROSINBASE BA01 (LANXESS Deutschland GmbH)
Nigrosine B: NUBIAN ® BLACK TN-870 (ORIENT CHEMICAL INDUSTRIES CO., LTD.)
Lithium chloride: lithium chloride AnalaR NORMAPUR ® ACS (VWR International GmbH)
Magnesium chloride: magnesium chloride water-free for the synthesis (Merck KGaA)
Lithium benzoate: lithium benzoate 99% (SIGMA-ALDRICH CHEMIE GmbH)

The examples according to the invention surprisingly show a significantly reduced crystallisation temperature at the same concentrations in comparison to the comparative examples which comprise only one of the two components of the examples according to the invention.

EXAMPLE 12-15

A polyamide 6 (Alphalon 27, Grupa Azoty ATT Polymers GmbH) was mixed with nigrosine and/or metal salt with different method parameters in the melt. The processing in the melt was implemented with a synchronous twin-screw extruder (Thermo Scientific Process 11). The method parameters are documented in Table 2. The hot melt was then cooled in a water bath and subsequently strand-granulated. The compositions are described in Table 3. For the tests, a weight proportion of 0.5% by weight of the anti-nucleation agents was chosen.

TABLE 2

| Method parameters | | | |
|---|---|---|---|
| Test setting | Melt temperature [° C.] | Speed of rotation [rpm−1] | Throughput [gh−1] |
| 1 | 240 | 450 | 1,000 |
| 2 | 260 | 150 | 1,000 |
| 3 | 260 | 450 | 1,000 |
| 4 | 260 | 750 | 1,000 |

Thermal analysis of the compounds was carried out according to the description for example 1-11. The characteristic value $T_{PC}$, relevant to the invention, is illustrated in Table 3 for all examples.

TABLE 3

Compositions and crystallisation temperatures of compositions according to the invention and comparative examples

| Example | Additives | Test setting | $T_{PC}$ [° C.] |
|---|---|---|---|
| Comparative example 12 | — | 1 | 187.1 |
| Comparative example 13 | — | 2 | 186.7 |
| Comparative example 1 | — | 3 | 186.9 |
| Comparative example 14 | — | 4 | 186.7 |
| Comparative example 15 | nigrosine A | 1 | 182.2 |
| Comparative example 16 | nigrosine A | 2 | 179.8 |
| Comparative example 2 | nigrosine A | 3 | 181.2 |
| Comparative example 17 | nigrosine A | 4 | 181.2 |
| Comparative example 18 | lithium chloride | 1 | 182.0 |
| Comparative example 19 | lithium chloride | 2 | 182.3 |
| Comparative example 7 | lithium chloride | 3 | 180.7 |
| Comparative example 20 | lithium chloride | 4 | 180.2 |
| Example 12 according to the invention | nigrosine A/lithium chloride 1:1 | 1 | 177.8 |
| Example 13 according to the invention | nigrosine A/lithium chloride 1:1 | 2 | 177.4 |
| Example 14 according to the invention | nigrosine A/lithium chloride 1:1 | 3 | 175.1 |
| Example 15 according to the invention | nigrosine A/lithium chloride 1:1 | 4 | 179.3 |

$T_{PC}$: crystallisation temperature
Nigrosine A: NIGROSINBASE BA01 (LANXESS Deutschland GmbH)
Lithium chloride: lithium chloride AnalaR NORMAPUR® ACS (VWR International GmbH)

The examples according to the invention show surprisingly, even with different process conditions, a significantly reduced crystallisation temperature in comparison to the comparative examples which comprise only one of the two components of the examples according to the invention.

EXAMPLE 16-17

A polyamide 6 (Alphalon 27, Grupa Azoty ATT Polymers GmbH) was mixed with nigrosine and/or metal salt in the melt. The nigrosine was used as raw material and in the form of a polyamide 6 master batch, with 20% by weight of nigrosine. The compositions are described in Table 4.

The compound- and also the master batch production were effected according to the description for example 1-11.

Thermal analysis of the compounds was carried out according to the description for example 1-11. The characteristic value $T_{PC}$, relevant to the invention, is illustrated in Table 4 for all examples.

TABLE 4

Compositions and crystallisation temperatures of compositions according to the invention and comparative examples

| Example | Additives | W [%] | $T_{PC}$ [° C.] |
|---|---|---|---|
| Comparative example 1 | — | 0 | 186.9 |
| Comparative example 2 | nigrosine A | 0.5 | 181.2 |
| Comparative example 4 | nigrosine A | 3.0 | 180.4 |
| Comparative example 7 | lithium chloride | 0.5 | 180.7 |
| Comparative example 9 | lithium chloride | 3.0 | 152.5 |
| Comparative example 21 | nigrosine A - MB20 | 0.5 | 178.6 |
| Comparative example 22 | nigrosine A - MB20 | 3.0 | 176.8 |
| Example 3 according to the invention | nigrosine A/lithium chloride 1:1 | 0.5 | 172.6 |
| Example 5 according to the invention | nigrosine A/lithium chloride 1:1 | 3.0 | 145.3 |
| Example 16 according to the invention | nigrosine A - MB20/lithium chloride 1:1 | 0.5 | 174.0 |
| Example 17 according to the invention | nigrosine A - MB20/lithium chloride 1:1 | 3.0 | 144.2 |

$T_{PC}$: crystallisation temperature;
w: mass proportion of the additive(s)
Nigrosine A: NIGROSINBASE BA01 (LANXESS Deutschland GmbH)
Lithium chloride: lithium chloride AnalaR NORMAPUR® ACS (VWR International GmbH)

The examples according to the invention surprisingly show, even with incorporation of a component in the form of a master batch, a significantly reduced crystallisation temperature at the same concentrations in comparison to the comparative examples which comprise only one of the two components of the examples according to the invention.

EXAMPLE 18-19

A polyamide 6 (Alphalon 27, Grupa Azoty ATT Polymers GmbH) was mixed with nigrosine and/or metal salt in the melt. The compositions are described in Table 5. All compounds were stabilised with 0.15% by weight of Irgafos 168 (BASF SE), 0.15% by weight of Irganox 1098 (BASF SE) and 0.2% by weight of Ceasit AV/PA (Baerlocher GmbH).

Processing in the melt was implemented with a synchronous twin-screw extruder (Leistritz MIC 27 GL/44D). The speed of rotation of the screws was 300 l/min, with a throughput of 5 kg/h and a melt temperature of 260° C. The hot melt was then cooled in a water bath and subsequently strand-granulated.

Thermal analysis of the compounds was carried out according to the description for example 1-11. The characteristic value $T_{PC}$, relevant to the invention, is illustrated in Table 5 for all examples.

TABLE 5

Compositions and crystallisation temperatures of compositions according to the invention and comparative examples

| Example | Additives | W [%] | $T_{PC}$ [° C.] |
|---|---|---|---|
| Comparative example 23 | — | 0 | 188.5 |
| Comparative example 24 | nigrosine B | 0.5 | 180.4 |
| Comparative example 25 | nigrosine B | 1.5 | 173.9 |
| Comparative example 26 | lithium chloride | 0.5 | 184.4 |
| Comparative example 27 | lithium chloride | 1.5 | 178.2 |
| Example 18 according to the invention | nigrosine B/lithium chloride 1:1 | 0.5 | 173.5 |
| Example 19 according to the invention | nigrosine B/lithium chloride 1:1 | 1.5 | 172.9 |

$T_{PC}$: crystallisation temperature;
w: mass proportion of the additive(s)
Nigrosine B: NUBIAN® BLACK TN-870 (ORIENT CHEMICAL INDUSTRIES CO., LTD.)
Lithium chloride: lithium chloride AnalaR NORMAPUR® ACS (VWR International GmbH)

The examples according to the invention surprisingly show, even on an enlarged processing scale and in the presence of stabiliser systems, a significantly reduced crystallisation temperature at the same concentrations in comparison to the comparative examples which comprise merely one of the two components of the examples according to the invention.

EXAMPLE 20-21

A polyamide 6 (Alphalon 27, Grupa Azoty ATT Polymers GmbH) was mixed with nigrosine and/or metal salt in the melt. The compositions are described in Table 6. All compounds were stabilised with 0.15% by weight of Irgafos 168 (BASF SE), 0.15% by weight of Irganox 1098 (BASF SE) and 0.2% by weight of Ceasit AV/PA (Baerlocher GmbH).

The compound production was effected according to the description for example 19-20.

From the compounds, test pieces of type 1A were produced according to DIN EN ISO 527-2. Production of the test pieces was effected following DIN EN ISO 294-1 with a Klöckner Ferromatik Desma injection moulding machine of the type FX 75-2F at 260° C.

The test pieces were conditioned with acceleration according to DIN EN ISO 1110. For this purpose, the test pieces were stored in an air conditioned cupboard for 10 days, in an atmosphere of (70±1°) C. and (62±1)% relative humidity (psychometric temperature difference of (10±3°) C.) until the test pieces had reached a moisture absorption of at least 95% of their equilibrium weight.

Thermal analysis of the compounds was carried out according to the description for example 1-11, except that the analysis was carried out on thin sections (300 μm) of the injection moulded and conditioned test pieces. The characteristic value $T_{PC}$, relevant to the invention, is illustrated in Table 6 for all examples.

TABLE 6

Compositions and crystallisation temperatures of compositions according to the invention and comparative examples

| Example | Additives | w [%] | $T_{PC}$ [° C.] |
|---|---|---|---|
| Comparative example 28 | — | 0 | 189.1 |
| Comparative example 29 | nigrosine B | 0.5 | 179.7 |
| Comparative example 30 | nigrosine B | 1.5 | 174.0 |
| Comparative example 31 | lithium chloride | 0.5 | 178.0 |
| Comparative example 32 | lithium chloride | 1.5 | 173.2 |
| Example 20 according to the invention | nigrosine B/lithium chloride 1:1 | 0.5 | 175.9 |
| Example 21 according to the invention | nigrosine B/lithium chloride 1:1 | 1.5 | 166.9 |

$T_{PC}$: crystallisation temperature;
w: mass proportion of the additive(s)
Nigrosine B: NUBIAN ® BLACK TN-870 (ORIENT CHEMICAL INDUSTRIES CO., LTD.)
Lithium chloride: lithium chloride AnalaR NORMAPUR ® ACS (VWR International GmbH)

The examples according to the invention surprisingly show a significantly reduced crystallisation temperature even after processing in the injection moulding process in the same concentrations in comparison to the comparative examples which comprise merely one of the two components of the examples according to the invention.

EXAMPLE 22

A polyamide 6 (Alphalon 27, Grupa Azoty ATT Polymers GmbH) was mixed with nigrosine and/or metal salt in the melt. The compositions are described in Table 7. All compounds were stabilised with 0.15% by weight of Irgafos 168 (BASF SE), 0.15% by weight of Irganox 1098 (BASF SE) and 0.2% by weight of Ceasit AV/PA (Baerlocher GmbH). For the tests, a weight proportion of 1.5% by weight of the anti-nucleation agents was chosen.

The compound production was effected according to the description for example 19-20.

Thermal analysis of the compounds was carried out by means of dynamic differential calorimetry (DSC) following DIN EN ISO 11357-7:2013-04. For examining the melt- and crystallisation behaviour, a DSC 822e (Mettler-Toledo AG) with a constant nitrogen throughflow of 20 ml/min and nitrogen cooling was used. The temperature and the heat flow were calibrated with indium and zinc. The sample quantity was always 5 mg with a deviation of ±0.1 mg. An aluminium crucible was used. The samples were heated at 50° C. min$^{-1}$ from 0° C. to 250° C. and kept there for 10 min in order to melt all the crystallites. Thereafter, the samples were cooled at 100° C. min$^{-1}$ to the relevant isothermal crystallisation temperatures and kept there until complete crystallisation of the samples. Isothermal crystallisation temperatures between 194 and 200° C., with a step width of 2° C., were used.

The ratio between the crystallinity at the time t and the crystallinity at the end of the crystallisation is termed relative crystallinity α. For each isothermal crystallisation temperature, the change of α as a function of time was plotted. The time until reaching the relative crystallinity of 0.5 ($t_{0.5}$) is a measure of the isothermal crystallisation speed. The characteristic value $t_{0.5}$, relevant to the invention, is illustrated in Table 7 as a function of the isothermal crystallisation temperature for all examples.

TABLE 7

Compositions and $t_{0.5}$ of compositions according to the invention and comparative examples

| Example | Additives | $T_i$ [° C.] | $t_{0.5}$ [min] |
|---|---|---|---|
| Comparative example 33 | — | 198 | 1.3 |
|  |  | 200 | 1.8 |
|  |  | 202 | 2.6 |
| Comparative example 34 | nigrosine B | 196 | 9.7 |
|  |  | 198 | 11.1 |
|  |  | 200 | 15.0 |
| Comparative example 35 | lithium chloride | 196 | 6.9 |
|  |  | 198 | 7.9 |
|  |  | 200 | 8.08 |
| Example 22 according to the invention | nigrosine B/lithium chloride 1:1 | 194 | 11.0 |
|  |  | 196 | 15.1 |
|  |  | 198 | 23.9 |

$T_{PC}$: crystallisation temperature;
$T_i$: isothermal crystallisation temperature;
$t_{0.5}$: time until reaching the relative crystallinity of 0.5
Nigrosine B: NUBIAN ® BLACK TN-870 (ORIENT CHEMICAL INDUSTRIES CO., LTD.)
Lithium chloride: lithium chloride AnalaR NORMAPUR ® ACS (VWR International GmbH)

The examples according to the invention surprisingly show a significantly extended time until reaching the relative crystallinity of 0.5 at the same concentrations in comparison to the comparative examples which comprise only one of the two components of the examples according to the invention.

EXAMPLE 23

A polyamide 6.6 (Radipol A45, RADICI CHIMICA S.p.A.) was mixed with a nigrosine and/or a metal salt in the melt. The compositions are described in Table 8. Processing in the melt was implemented analogously to Example 1-11. The melt temperature was 285° C.

Thermal analysis of the compounds was carried out analogously to Example 1-11. The samples were heated at 10° C. min-1 from 0° C. to 300° C. and kept there for 3 min.

Thereafter, the sample was cooled again to 0° C. at 10° C. min$^{-1}$. This cycle was repeated twice. The characteristic value $T_{PC}$, relevant to the invention, is illustrated in Table 8 for all examples.

TABLE 8

Compositions and crystallisation temperatures of compositions according to the invention and comparative examples

| Example | Additives | W [%] | $T_{PC}$ [° C.] |
|---|---|---|---|
| Comparative example 36 | — | 0 | 229.4 |
| Comparative example 37 | nigrosine A | 3.0 | 218.0 |
| Comparative example 38 | lithium chloride | 3.0 | 201.6 |
| Example 23 according to the invention | nigrosine A/lithium chloride 1:1 | 3.0 | 191.1 |

$T_{PC}$: crystallisation temperature;
w: mass proportion of the additive(s)
Nigrosine A: NIGROSINBASE BA01 (LANXESS Deutschland GmbH)
Lithium chloride: lithium chloride AnalaR NORMAPUR® ACS (VWR International GmbH)

The examples according to the invention surprisingly show a significantly reduced crystallisation temperature at the same concentrations in comparison to the comparative examples which comprise only one of the two components of the examples according to the invention.

The invention claimed is:

1. A polymer composition, comprising or consisting of
   a) a matrix made of at least one crystallisable, thermoplastic polymer,
   b) at least one azine dye, and
   c) at least one mono-, bi-, tri- and/or tetravalent metal salt, selected from the group consisting of metal chlorides, metal bromides and metal pseudohalogenides, mixtures thereof, and combinations thereof.

2. The polymer composition according to claim 1, wherein the at least one azine dye is selected from the group consisting of phenazine dyes, oxazine dyes, thiazine dyes, and bisazine dyes.

3. The polymer composition according to claim 1, wherein the at least one azine dye is selected from the group consisting of nigrosines and indulines.

4. The polymer composition according to claim 1, wherein the at least one mono-, bi-, tri- and/or tetravalent metal salt is selected from the group consisting of alkali metal salts and alkaline earth metal salts.

5. The polymer composition according to claim 1, wherein the weight ratio of the at least one azine dye to the at least one mono-, bi-, tri- and/or tetravalent metal salt is from 1:99 to 99:1.

6. The polymer composition according to claim 5, wherein the at least one crystallisable, thermoplastic polymer of the polymer matrix is selected from the group consisting of
   a) polymers of olefins or diolefins,
   b) polyacetals,
   c) polyphenylene oxides and blends with polystyrene or polyamides,
   d) polyamides,
   e) polyimides, polyamide imides, polyetherimides, polyesterimides, poly(ether)ketones, polyarylsulphones, polyphenylensulphide, polybenzimidazoles, and polyhydantoins,
   f) polyesters made of aliphatic or aromatic dicarboxylic acids or diols or from hydroxycarboxylic acids, and
   g) mixtures, combinations or blends of two or more of the previously mentioned polymers, and blends with amorphous polymers.

7. The polymer composition according to claim 5, wherein the polymer matrix consists of a polymer selected from the group consisting of polyamides and polyesters.

8. The polymer composition according to claim 1, comprising or consisting of
   a) 99.98 to 80.00 parts by weight of a matrix made of at least one crystallisable, thermoplastic polymer,
   b) 0.01 to 10 parts by weight of at least one azine dye, and
   c) 0.01 to 10 parts by weight of at least one mono-, bi-, tri- and/or tetravalent metal salt,
   the parts by weight of components a) to c) adding up to 100 parts by weight.

9. The polymer composition according to claim 1, comprising or consisting of
   a) 99.98 to 80.00 parts by weight of a matrix made of at least one polyamide or polyester,
   b) 0.01 to 10 parts by weight of at least one nigrosine, and
   c) 0.01 to 10 parts by weight of at least one alkali- or alkaline earth metal halogenide or -pseudohalogenide,
   the parts by weight of components a) to c) adding up to 100 parts by weight.

10. The polymer composition according to claim 1, wherein, in addition to components a) to c), it comprises at least one additive selected from the group consisting of UV absorbers, light stabilisers, stabilisers, hydroxylamines, benzofuranones, metal deactivators, filler deactivators, nucleation agents, impact strength enhancers, flame retardants, plasticisers, lubricants, rheology modifiers, chain lengtheners, processing aids, pigments, colourants, optical brighteners, antimicrobial active substances, antistatic agents, slip agents, antiblocking agents, coupling means, dispersants, compatibilisers, oxygen collectors, acid collectors, marking means, anti-fogging means, filler/reinforcing materials and mixtures and combinations of at least two of the previously mentioned additives.

11. The polymer composition according to claim 1, wherein the at least one azine dye and/or the at least one mono-, bi-, tri- and/or tetravalent metal salt is incorporated by means of a master batch with respect to the polymer composition, identical to the matrix made of the at least one crystallisable material.

12. The polymer composition according to claim 1, wherein, in comparison to a polymer composition which comprises no azine dye and/or a mono-, bi-, tri- and/or tetravalent metal salt, the crystallisation point thereof is reduced, the crystallisation speed thereof is lower and/or the crystallisation behaviour thereof is delayed.

13. An additive composition for delaying crystallisation of crystallisable, thermoplastic polymers or polymer compositions, consisting of or comprising
   a) at least one azine dye and
   b) at least one mono-, bi-, tri- and/or tetravalent metal salt, selected from the group consisting of metal chlorides, metal bromides and metal pseudohalogenides and mixtures or combinations thereof.

14. The additive composition according to claim 13, wherein the at least one azine dye is selected from the group consisting of phenazine dyes, oxazine dyes, thiazine dyes and bisazine dyes.

15. The additive composition according to claim 13, wherein the at least one mono-, bi-, tri- and/or tetravalent metal salt is selected from the group consisting of alkali metal salts and alkaline earth metal salts.

16. The additive composition according to claim 13, wherein the weight ratio of the at least one azine dye to the at least one mono-, bi-, tri- and/or tetravalent metal salt is from 1:99 to 99:1, the additive composition being generally free of transition metal halogenides.

17. A method for delaying crystallisation, for reducing the crystallisation speed, and/or for lowering the crystallisation temperature of a crystallisable, thermoplastic polymer, in which an additive composition is:

added to a polymer matrix, comprising or consisting of at least one crystallisable, thermoplastic polymer, the polymer matrix is transferred into the melt and subsequently cooled, or incorporated in a polymer matrix in the molten state, comprising or consisting of at least one crystallisable, thermoplastic polymer, and subsequently is cooled;

wherein the additive composition consists of or comprises:

a) at least one azine dye and
  b) at least one mono-, bi-, tri- and/or tetravalent metal salt, selected from the group consisting of metal chlorides, metal bromides, and metal pseudohalogenides, and mixtures or combinations thereof.

18. The method according to claim 17, wherein the additive composition or individual components of the additive composition are introduced in the form of a master batch or concentrate, the master batch comprising a matrix made of at least one crystallisable, thermoplastic polymer, in which master batch the additive composition, which is identical to the matrix of the polymer composition, is present.

19. A method of producing a moulded part from the polymer composition claim 1, which involves injection moulding, extrusion, a generative manufacturing method, a 3D printing method, a deep-drawing- or blow-moulding method.

* * * * *